United States Patent [19]

Saper

[11] Patent Number: 5,273,352
[45] Date of Patent: Dec. 28, 1993

[54] LOAD-DISTRIBUTING PLATFORM TRANSPORT APPARATUS

[75] Inventor: Barry Saper, 25733 Vinedo La., Los Altos Hills, Calif. 94022

[73] Assignee: Barry Saper, Los Altos Hills, Calif.

[21] Appl. No.: 973,111

[22] Filed: Nov. 6, 1992

[51] Int. Cl.⁵ .................... A47B 81/06; A47B 51/00
[52] U.S. Cl. ................... 312/7.2; 312/312; 312/319.5; 312/319.7
[58] Field of Search .............. 312/319.5, 319.7, 312, 312/208.5, 7.2, 223.3

[56] References Cited

U.S. PATENT DOCUMENTS

| | | | |
|---|---|---|---|
| 463,848 | 11/1891 | Van Derveer | 312/312 |
| 673,804 | 5/1901 | Van Fleet | 312/312 |
| 2,499,579 | 4/1945 | Fritsch | 178/7.5 |
| 2,875,012 | 2/1959 | Riley | 312/223 |
| 3,066,993 | 12/1962 | Mark | 312/20 |
| 3,454,317 | 7/1969 | Salkind | 312/21 |
| 3,650,591 | 3/1972 | Longmire, Sr. | 312/312 |
| 3,761,152 | 9/1973 | Cory | 312/7 |
| 4,151,804 | 5/1979 | Wache et al. | 108/147 |
| 4,568,132 | 2/1986 | Watt | 312/312 |
| 4,880,285 | 11/1989 | Brinkers | 312/312 |
| 5,088,421 | 2/1992 | Beckstead | 108/144 |

Primary Examiner—P. W. Echols
Assistant Examiner—David P. Bryant
Attorney, Agent, or Firm—Townsend and Townsend Khourie and Crew

[57] ABSTRACT

The invention provides a load-distributing platform transport apparatus comprising a housing, a platform disposed in the housing and movable in the first direction, a capstan rotatably mounted to the housing and an endless cable guidably coupled to the housing and wound about the capstan to move therewith. The cable is configured to have four segments generally parallel and movable in the same direction simultaneously, the platform being fastened to each of the four segments. Means for rotating the capstan, such as an electric motor, are provided. When the capstan is rotated, it translates the endless cable such that each of the four segments moves in a desired direction thereby moving the platform. By providing an endless cable to which the platform is attached at four separate points, no part of the platform can move in a particular direction without the remaining points of attachment also moving.

17 Claims, 8 Drawing Sheets

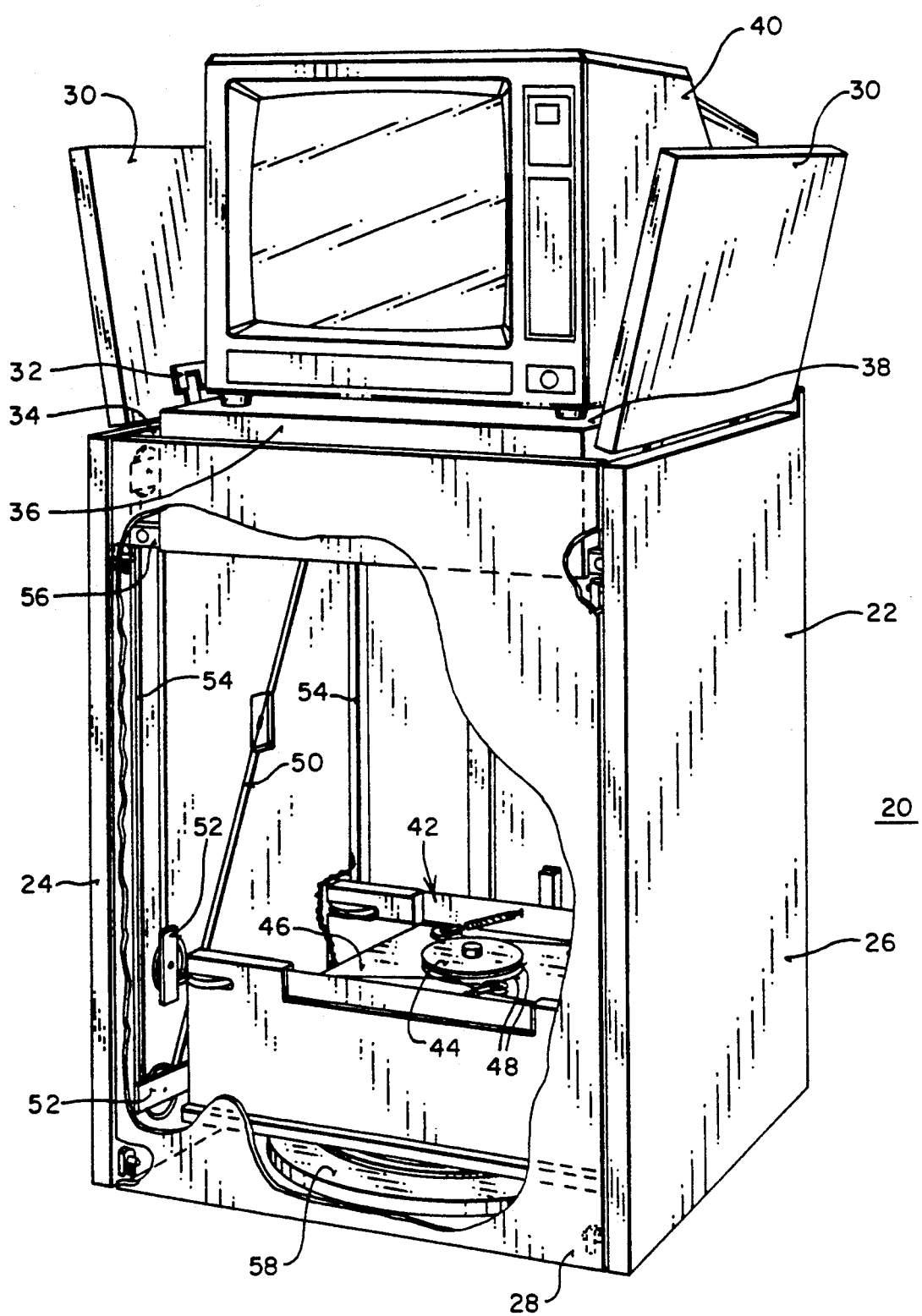
FIG _1

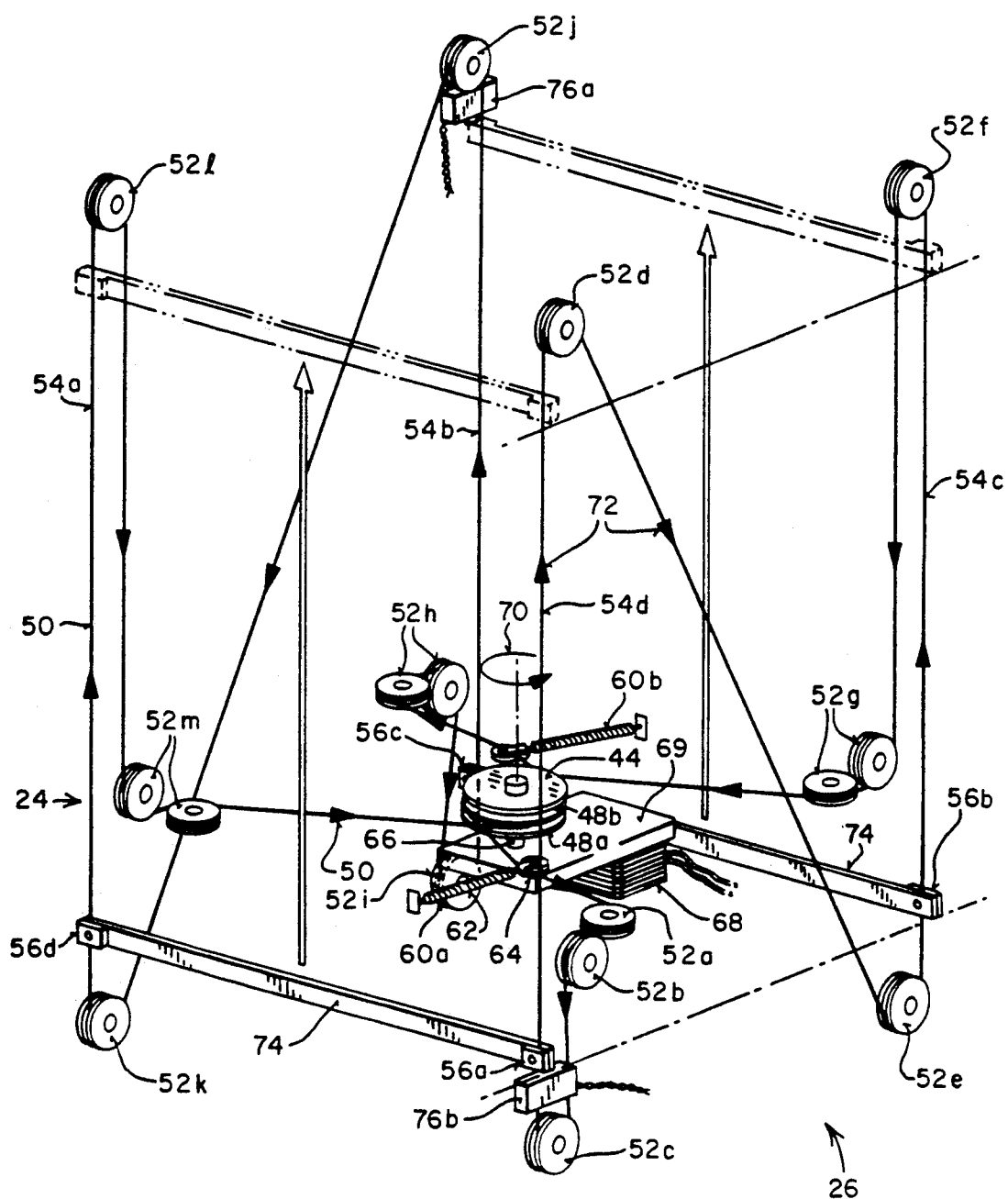
FIG_2

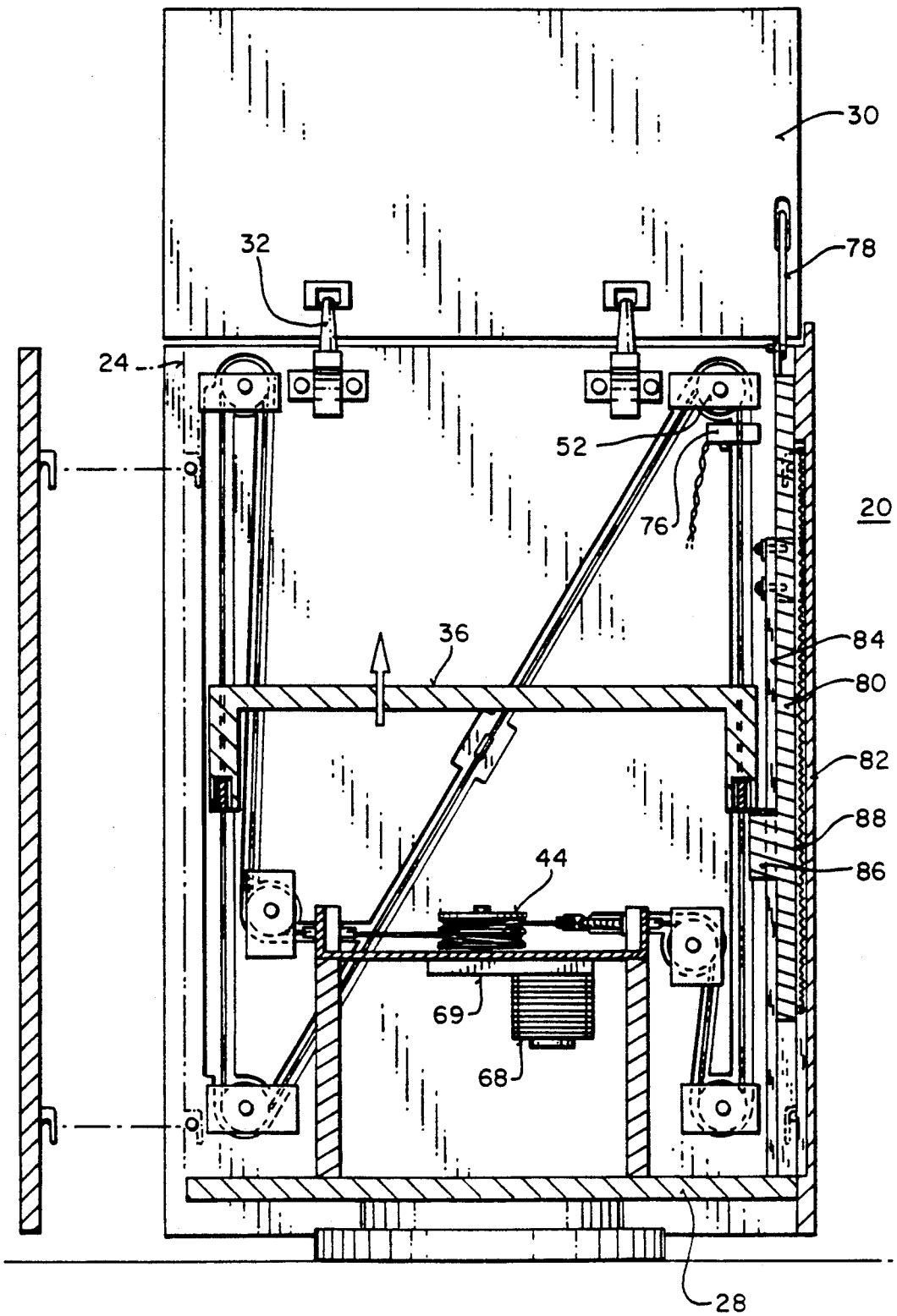
FIG_4A

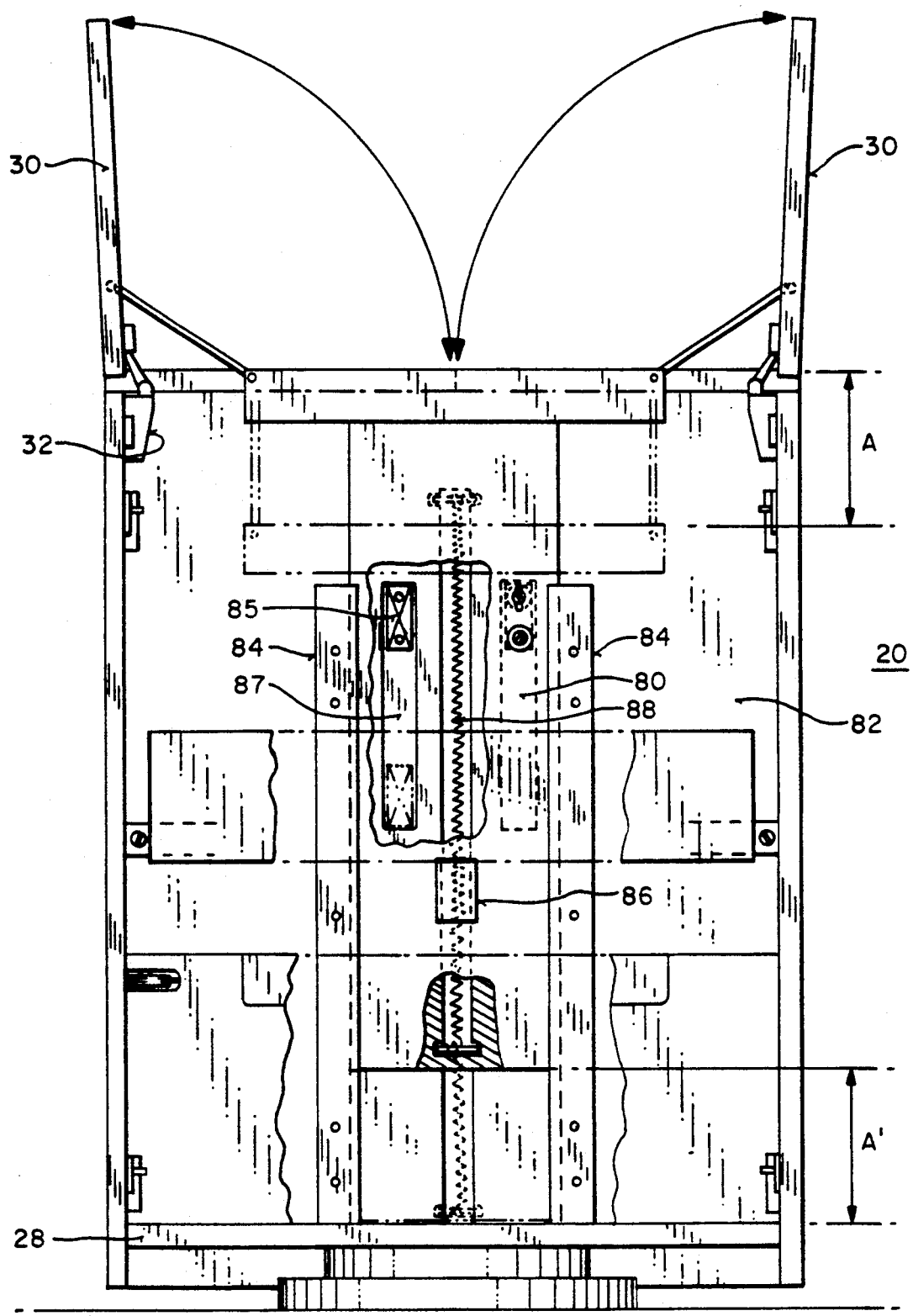

FIG_5
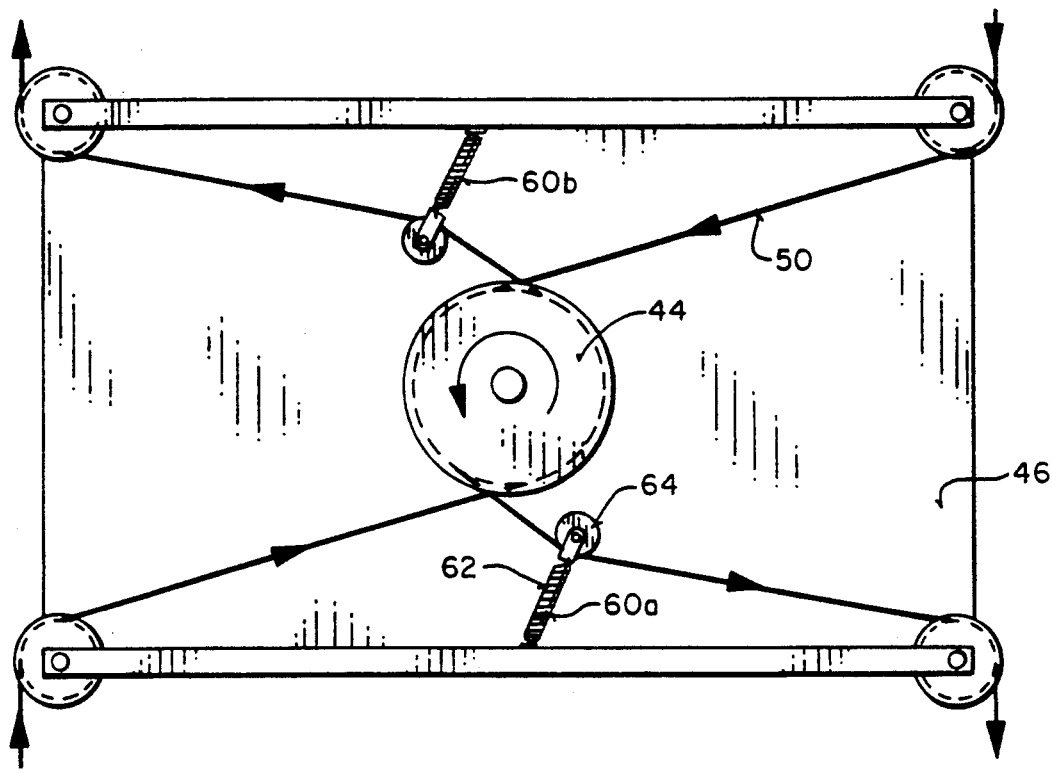
FIG_6
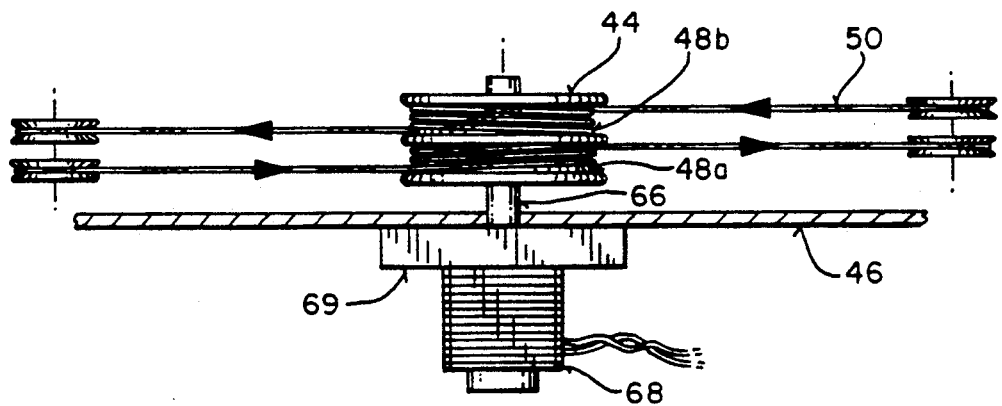

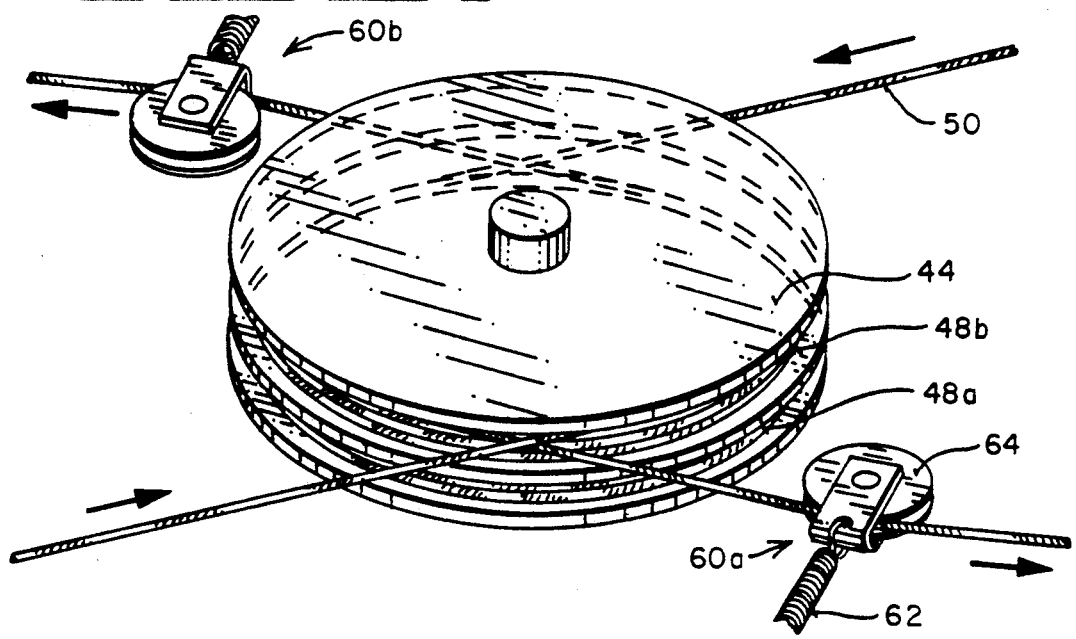
FIG_7
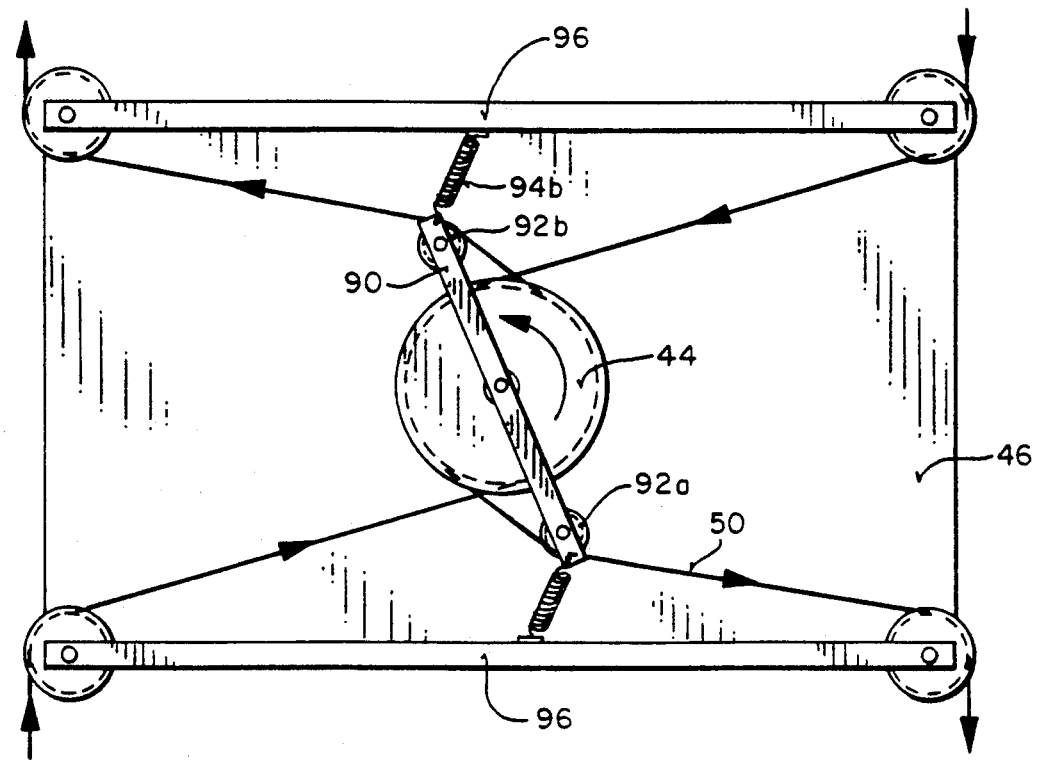
FIG_8

LOAD-DISTRIBUTING PLATFORM TRANSPORT APPARATUS

BACKGROUND OF THE INVENTION

The present invention relates generally to transport mechanisms for support platforms, and more specifically to platform transport mechanisms for use in television-concealing furniture, dumbwaiters and the like.

Televisions, stereo systems, personal computers and other consumer electronics products are found in practically every modern home, office and hotel room. It is frequently desirable to store such products out of sight and out of harm's way, to preserve the aesthetic decor of the room and to protect the devices from damage or theft. It is often desirable to conceal these products in a piece of furniture, such as a cabinet, desk, credenza or armoire, which blends with the design scheme of the room, and which provides a protective structure about the device. Such concealing furniture may advantageously include a movable platform on which the relevant device is placed, for transporting the device from a user-accessible and visible position to a concealed, stored position.

Various apparatus having movable platforms have been developed for concealing televisions, stereos, computers and other products. Typically, such devices consist of a cabinet in which is mounted a movable platform for supporting, for example, a television. The platform is movable from a first position in which the television is concealed from sight within the cabinet to a second position where the television can be viewed. Usually, the cabinet is in the form of a box having an open top, with the platform moving from a position at the bottom of the cabinet to a raised position, exposing the television on the upper side of the cabinet. An example of such a device is seen in U.S. Pat. No. 3,761,152 to Cory, issued Sept. 25, 1973.

It has been recognized, however, that known platform transport mechanisms found in devices for concealing televisions and the like suffer from certain disadvantages. Significant among these is the unequal load distribution exhibited by such mechanisms. Known platform transport mechanisms typically utilize a lead screw, scissor-type linkage, cable or rack and pinion design which does not positively and evenly distribute the weight of the supported object on the platform. Electronics products such as televisions frequently have varying weight distributions depending on the size, shape and manufacturer of the product. Because of the uneven weight distribution of such products, known transport mechanisms have not been suitable for use in a universal design useful for a variety of products. Furniture or cabinets for concealing televisions and the like have therefore been generally custom designed for the particular application and product with which it will be used. Because of the unsuitability for mass production, the cost of such devices has been undesirably high. In addition, known platform transport mechanisms have been found to become easily misaligned, and the support platforms in such mechanisms have become unlevel, due to unequal weight distribution and independent forces exerted on various points on the platform by the transport mechanism.

For these and other reasons, a platform transport mechanism is desired which has a universal design suitable for use with products of various sizes, shapes and manufacturers. The platform transport mechanism should provide even weight distribution about the platform to maintain alignment with the surrounding structure and levelness of the platform. The platform transport mechanism will support the platform at four places to ensure stability. The platform transport mechanism should be susceptible to mounting in an enclosure or cabinet for aesthetic, protective and/or security purposes. Preferably, the cabinet will have a door through which the platform may be extended, the door automatically opening in response to movement of the platform. Further, the platform transport mechanism will have a simple, low-cost and universal design suitable for mass production.

SUMMARY OF THE INVENTION

The present invention provides a platform transport apparatus with a wide range of applications having particular usefulness in cabinets for concealing equipment such as televisions, stereos, computers and the like, as well as in dumbwaiters, elevators and other lifting devices. The invention is particularly suitable as a platform transport apparatus wherein the surrounding structure must not extend beyond the plane of the raised platform. The platform transport apparatus is advantageous over known devices because of its equal distribution of the load of the supported object, providing improved platform alignment and levelness. Further, the platform transport apparatus has a universal design suitable for use with a wide variety of equipment types, sizes, shapes and manufacturers. Moreover, the platform transport apparatus has a simple and low cost design suitable for mass production.

In an exemplary embodiment, the platform transport apparatus comprises a housing having a base and sidewalls, with a platform disposed in the housing and movable in a first direction generally parallel to the sidewalls. A capstan is rotatably mounted to the base. An endless cable is guidably coupled to the housing and wound about the capstan to move therewith. The endless cable has a first segment mounted to the platform at a first point and a second segment mounted to the platform at a second point, a third segment mounted to the platform at a third point and a fourth segment mounted to the platform at a fourth point. The first, second, third and fourth segments are parallel to the first direction and movable in the same direction simultaneously. The apparatus further includes means for rotating the capstan so as to move the platform.

In a preferred embodiment, the first direction will be vertical and the platform will have a horizontal support surface. The cabinet will usually have a base and four sides defining a box-like enclosure with an open top. In this embodiment, the platform will move from a concealed position at the bottom of the enclosure to a visible position at the top of the enclosure so as to expose the television or other object with which the apparatus is used. The apparatus will preferably have a door on the open side of the enclosure which is openable in response to movement of the platform. In this way, as the platform is moved to the visible position, the door opens automatically allowing the supported object to pass to a visible position.

The capstan will preferably comprise a dual concentric capstan, having a pair of single capstans fixed to one another to rotate about a common axis. The endless cable will be wrapped about the dual concentric capstan and will be guided within the housing by guiding means such as pulleys mounted in the interior of the housing. In a preferred embodiment, the endless cable will have four vertical segments each attached to a different point on the platform, each of the vertical segments being movable in the same direction (e.g. up or down) simultaneously. In this way, rotation of the capstan will move the endless cable, thereby moving the four vertical segments up or down accordingly. By attaching each of the four vertical segments to each of four corners of the platform, the mechanism provides a load-distributing lifting mechanism which remains level and well-aligned regardless of the distribution of weight on the platform. The mechanism further eliminates the use of counterweights, lead screws, gears, and other such mechanisms adding complexity and cost to prior art devices.

Usually a reversible electric motor will be coupled to the capstan to rotate the capstan for raising and lowering the platform. Alternatively, a hand crank could be used.

In an exemplary embodiment, the platform transport mechanism will be mounted in a cabinet or piece of furniture suitable for concealing a television, stereo, computer or other such product. The mechanism may be independent of the surrounding cabinet, or it may utilize the cabinet structure for its sidewalls and base. The invention will find further application in a variety of lifting mechanisms for both home and industrial uses, such as dumbwaiters, elevators and the like.

BRIEF DESCRIPTION OF THE DRAWINGS

FIG. 1 is a perspective view of the platform transport apparatus constructed in accordance with the principles of the present invention.

FIG. 2 is a perspective view illustrating the endless cable configuration and dual concentric capstan of the platform transport apparatus of FIG. 1.

FIG. 4A is a side cross-sectional view of the platform transport apparatus of FIG. 1.

FIG. 4B is a front cross-sectional view of the door opening apparatus in the platform transport apparatus of FIG. 1.

FIG. 5 is a top elevational view of the dual concentric capstan and endless cable configuration at the base of the platform transport apparatus of FIG. 1.

FIG. 6 is a front view of the dual concentric capstan and endless cable configuration at the base of the platform transport apparatus of FIG. 1.

FIG. 7 is a perspective view of the dual concentric capstan of the platform transport apparatus of FIG. 1.

FIG. 8 is a top view of an alternative embodiment of a tensioning device used in conjunction with the dual concentric capstan and endless cable in the platform transport apparatus of FIG. 1.

DESCRIPTION OF SPECIFIC EMBODIMENTS

Figure 3A:
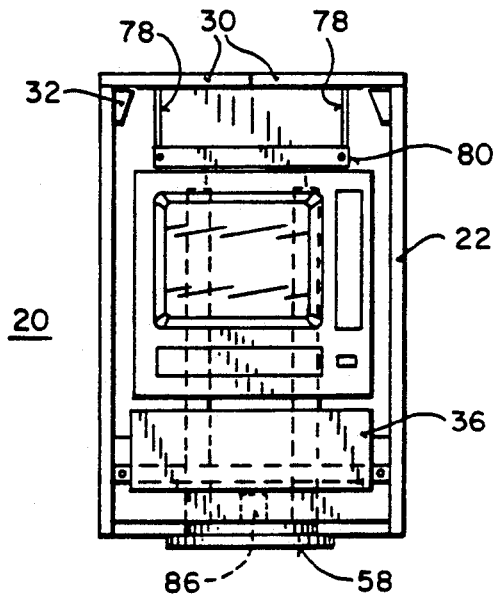
FIGS. 3A-3C are front elevational views of the platform transport apparatus of FIG. 1 illustrating the lifting of a television from a concealed position to a visible position.

The invention provides a platform transport apparatus useful for a variety of purposes, including movable concealment of electronic products such as televisions, televison projectors, stereos and computers, as well as for driving transport machinery such as dumbwaiters and elevators. The invention may therefore be embodied in a variety of forms, including cabinets, furniture, building structures and industrial equipment.

In any of these embodiments, the platform transport apparatus will include a housing or frame within which is disposed a movable platform. A dual concentric capstan will be rotatably mounted to the housing or frame, and an endless cable will be wrapped about the capstan and guidably coupled to the housing or frame, such that the endless cable has a first segment attached to a first point on the platform, a second segment attached to a second point on the platform, a third segment attached to a third point on the platform and a fourth segment attached to a fourth point on the platform, the four segments being parallel and movable in the same direction simultaneously. The apparatus will further include means for rotating the capstan so as to move the cable, thereby moving the platform. Usually, the platform will have a horizontal support surface and will be movable in a vertical direction. However, it will be understood that the platform may be arranged vertically or at any other angle relative to the housing or frame, and may be movable horizontally or any other desired angle with the addition of suitable slides or guides. It will further be understood that the housing or frame maybe freestanding, suspended from a wall or ceiling of a support structure, or integrated into a piece of furniture or the frame of a building.

Referring now to the figures, a preferred embodiment of the platform transport apparatus will be described. As shown in FIG. 1, the platform transport apparatus 20 includes a housing 22 defining a box-like enclosure with sides 24, 26 and base 28. Housing 22 will ordinarily be constructed of a rigid material providing a support structure for the apparatus. Alternatively, a rigid support frame may be provided, to which a non-structural exterior is mounted. A pair of doors 30 are mounted by hinges 32 to the upper ends of side members 24, 26 so as to cover open end 34 of housing 22 when in a closed position. A platform 36 is disposed within housing 22 and movable vertically up and down parallel to side members 24, 26. Platform 36 has a horizontal support surface 38 for supporting an object such as a television 40.

Platform 36 is moved up and down by a transport mechanism 42 comprising a dual concentric capstan 44 rotatably mounted to a drive base 46 as further described below. Dual concentric capstan 44 includes a pair of capstans 48 fixed to one another in a parallel relationship to rotate about a common axis. An endless cable 50 is wrapped about capstan 44 and is guidably coupled to housing 22 by means of pulleys 52 mounted to the interior of side members 24, 26. Endless cable 50 is configured to include a plurality of vertical segments 54 adjacent and parallel to side members 24, 26. Platform 36 is attached to segments 54 by means of clamps 56. When capstan 44 is rotated, segments 54 all move simultaneously in the same direction, either up or down, thereby transporting platform 36 between a lower or concealed position within housing 22 and a raised or visible position outside of housing 22. As will be described below, when platform 36 is moved into the position shown in FIG. 1, doors 30 open automatically permitting television 40 to pass through opening 34. Housing 22 may be mounted on a turntable 58, permitting the apparatus to be rotated into a desired position for viewing.

Referring now to FIG. 2, transport mechanism 42 will be described in greater detail. Endless cable 50 is wound about a first capstan 48a of dual concentric capstan 44 in frictional engagement therewith. The term "endless" as used herein is intended to mean that cable 50 is a single, continuous loop, without free ends. Cable 50 may be wrapped in multiple turns about capstan 48a to improve engagement so as to translate cable 50 when capstan 44 rotates. Cable 50 extends from capstan 48a through a tensioning device 60a, which may comprise a spring 62 fixed to housing 22 on one end, and at a second end attached to a pulley 64 which guides cable 50. Cable 50 then extends around a pulley 52a mounted to drive base 46 to rotate about a vertical axis. A second pulley 52b mounted to side 26 perpendicularly to pulley 52a guides the cable to a third pulley 52c at the lower end of side 26, from which the cable extends vertically to pulley 52d at the top of side 26. A vertical segment 54d of cable 50 is thus formed, to which clamp 56a is fastened.

Cable 50 then extends diagonally to pulley 52e at the lower end of side 26 opposite pulley 52c, and then vertically upward to pulley 52f at the top end of side 26 opposite pulley 52d. Vertical segment 54c is thereby formed, to which clamp 56b is fastened. Cable 50 is then guided via pulleys 52g back to capstan 48b of dual concentric capstan 44. Cable 50 is wrapped about capstan 48b and extends through pulleys 52h and to a pulley 52i mounted at a lower end of side member 24. A second tensioning mechanism 60b is mounted to housing 22 for tensioning cable 50 between capstan 48b and pulleys 52h. Cable 50 extends from pulley 52i to pulley 52j at the upper end of side 24, diagonally downward to pulley 52k at the lower end of side member 24, and vertically upward to pulley 52l at the top of side member 24. Vertical segments 54a, 54b are thus formed, to which clamps 56c and 56d are fastened. From pulley 52l, cable 50 extends downward to pulleys 52m and back to capstan 48a of dual concentric capstan 44.

Dual concentric capstan 44 is fixed to a shaft 66 driven by a reversible electric gear motor 68. Motor 68 has an integrated gearbox 69, which provides a significant mechanical advantage so as to allow the use of a motor of extremely small size. In one embodiment, gearbox 69 provides a 600:1 mechanical advantage between motor 68 and capstan 44. The motor will preferably be activated by means of either switches mounted on housing 22, or by radio or infrared remote control.

When motor 68 rotates capstan 44 in the direction of arrow 70, cable 50 is driven in the direction shown by arrows 72. It may be seen that vertical segments 54a-54d move simultaneously upward, thereby carrying clamps 56a-56d from a lower position to an upper position. When the direction of motor 68 is reversed, segments 54a-54d are moved downward, returning clamps 56a-56d to the lowered position. Because segments 54a-54d are all part of the continuous, endless cable 50, no individual segment can move without the other segments also moving. Crossbeams 74 extend between clamps 56a, 56d and clamps 56b, 56c for supporting platform 36. Transport mechanism 42 thereby raises and lowers platform 36 in precise alignment with housing 22 and maintains support surface 38 horizontally level.

The apparatus further includes limit switches 76a, 76b mounted to housing 22, a first limit switch 76a being mounted at an upper position on side 24, and a second limit switch 76b mounted on a lower portion of side 26. Limit switches 76a, 76b are positioned so that clamps 56 and/or crossbeam 74 contact the limit switches 76a, 76b in the upper and lower positions, respectively. The limit switches are electrically coupled to motor 68, such that upon contact with clamps 56, limit switches 76 turn off motor 68. In this manner, the apparatus will automatically shut-off when the platform has been raised to the viewing position or lowered to the concealed position.

A brake may be provided for motor 68 to prevent overrun of platform 36 beyond the desired raised or lowered position. The brake may be actuated in response to limit switches 76. In a preferred embodiment, a gravity actuated cone brake acting on shaft 66 of motor 68 is used.

As illustrated in FIGS. 5-7, cable 50 is wound in a plurality of turns about each of the capstans 48a, 48b of dual concentric capstan 44. This increases the frictional engagement between the capstan 44 and cable 50 to facilitate lifting of platform 36 when loaded. In addition, the winding of cable 50 about capstan 44 provides clutch-like disengagement of the transport mechanism 42 from platform 36 when the loading on the platform exceeds a certain level. This occurs through slippage of cable 50 on capstan 44 when the load on the cable exceeds the frictional forces between the capstan and the cable. The load at which such slippage occurs may be adjusted by increasing or decreasing the number of wraps of cable 50 about capstan 44.

FIGS. 4A-4B illustrate the construction of doors 30 of the platform transport apparatus. Doors 30 are mounted to side members 24, 26 by means of hinges 32. A T-shaped sliding member 80 is mounted to backside 82 of housing 22 in a vertical track 84. An adjustable stop 85 attached to sliding member 80 is slidably disposed in a channel 87 on backside 82. A horizontal shelf 86 at a lower end of sliding member 80 engages the bottom side of platform 36. A connecting rod 78 is pivotally coupled to door 30 and the upper end of sliding member 80. A spring 88 is connected between sliding member 80 and housing 22 to bias sliding member 80 in an upward direction, thereby keeping shelf 86 in contact with platform 36 as the platform is raised. In this way, when platform 36 is raised, sliding member 80 is drawn upward under the tensile force of spring 88, pushing connecting rod 78 upward and opening doors 30. When platform 36 is lowered, the bottom side of the platform engages shelf 86 of sliding member 80, pulling connecting rods 78 downward to return doors 30 to a closed position.

Figure 3B:
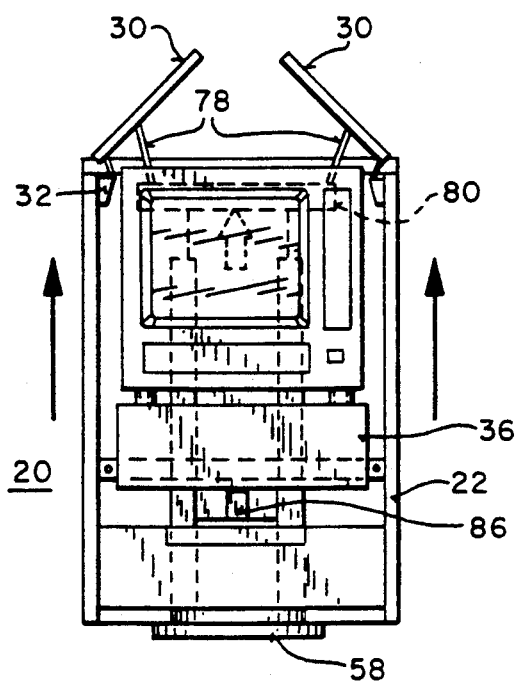
Figure 3C:
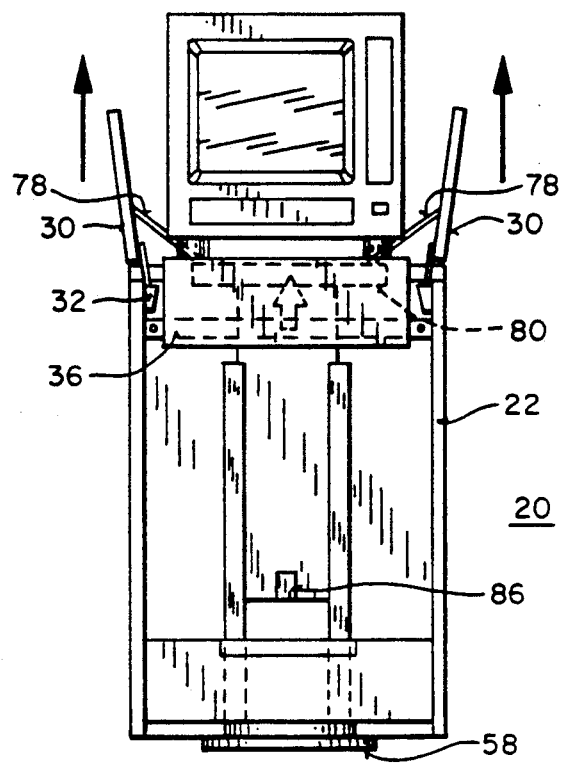

As shown in FIGS. 3A to 3C, sliding member 80, under the tensile force of spring 88, moves upward with platform 36 until doors 30 are in a fully open position, shown in FIG. 3D. At that point, sliding member 80 has moved to its highest position, further being prevented by adjustable stop 85 engaging the upper end of channel 87. Sliding member 80 thus remains in a stationary position while platform 36 continues to move upward such that doors 30 remain in the vertical position. This configuration thereby provides the proper timing of the opening and closing of doors 30. When platform 36 is lowered, it will not contact horizontal shelf 86 of sliding member 80 until the platform is lowered enough to bring television 40 within housing 22. At that point, platform 36 contacts shelf 86, drawing sliding member 80 downward until doors 30 are fully closed.

FIGS. 3A-3C also illustrate a further preferred aspect of the invention, wherein platform 36 is configured to engage a stop in housing 22 (not shown) which supports platform in the position of FIG. 3A. Limit switches 76b are positioned such that motor 68 continues to turn even after platform 36 has reached the stop, lowering the crossbeams 74 just below the platform (FIG. 3A). This removes the weight of the loaded platform from crossbeams 74 so that motor 68 need not provide continual support when the device is not in use.

An alternative configuration of the tensioning mechanism 60a, 60b is illustrated in FIG. 8. In this embodiment, a lever 90 is pivotally mounted to shaft 66 so as to be rotatable about an axis in common with capstan 44. Lever 90 has pulleys 92a, 92b mounted to its opposing ends which engage cable 50. Springs 94a, 94b extend between sidewalls 96 of drive base 46 and the ends of lever 90. Lever 90 thereby exerts an outward tension on cable 50, increasing frictional engagement with capstan 44.

Figure 9A:
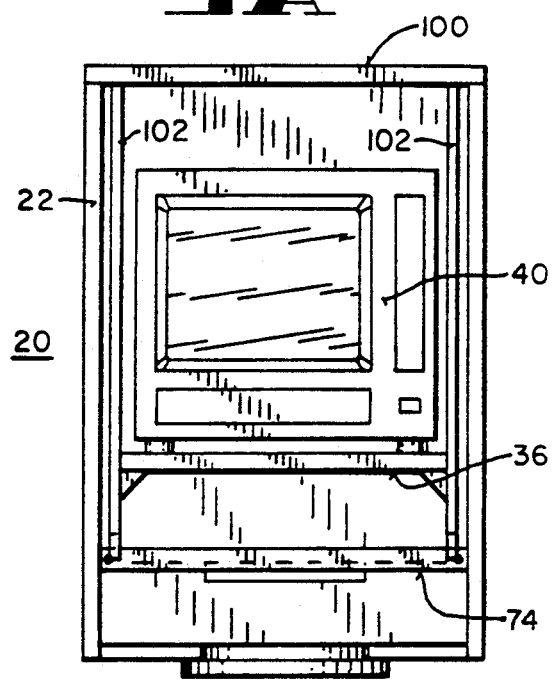
FIGS. 9A-9C are front elevational views illustrating an alternative embodiment of the platform transport apparatus of FIG. 1, wherein the door of the apparatus is mounted to the platform on fixed supports to the platform.
Figure 9C:
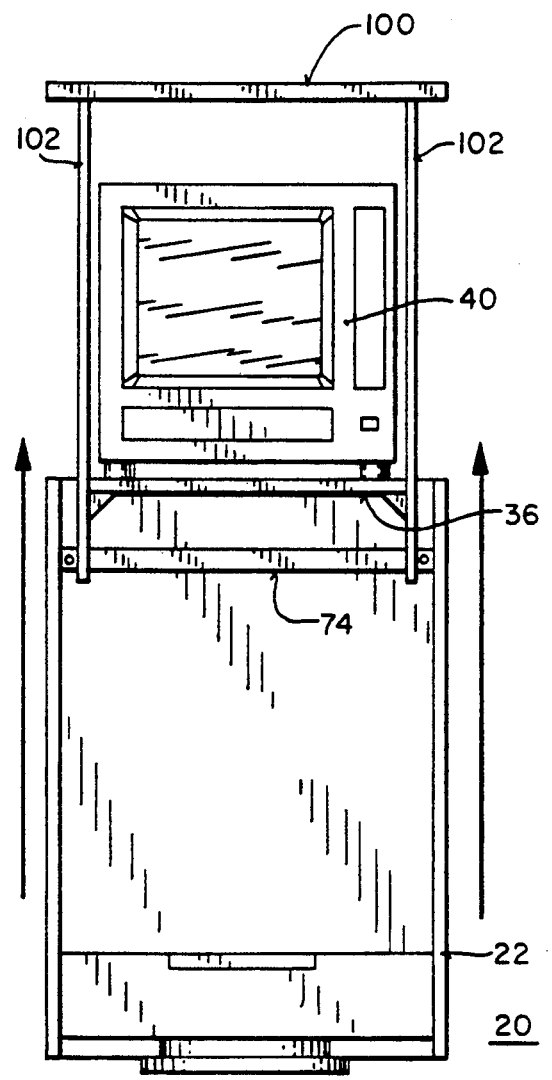
Figure 9B:
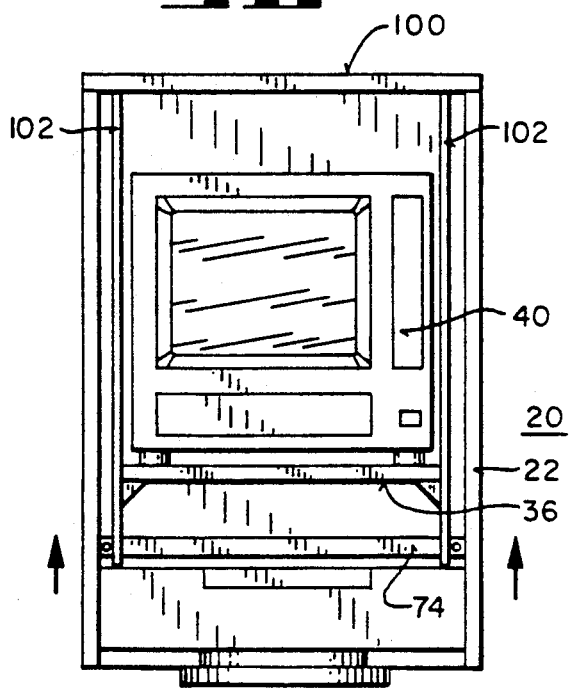

FIGS. 9A-9C illustrate an alternative embodiment of the platform transport apparatus having a single horizontal door 100 which is fixed with respect to platform 36. In this embodiment, door 100 is mounted to the upper ends of support members 102. Support members 102 are coupled at their lower ends to crossbeams 74 and are supported by the crossbeams to move therewith. As shown in FIGS. 9B and 9C, platform 36, support members 102 and door 100 move together as the platform is raised and lowered.

In a preferred embodiment, door 100 and support members 102 are detachably mounted to crossbeams 74. When platform 36 is moved downward, door 100 on support members 102 is brought downward into engagement with the top of housing 22. Door 100 remains seated in place on the top of the housing, while platform 36 continues to move downward with crossbeams 74. This ensures proper alignment of door 100 with housing 22. When the platform is raised, crossbeams 74 move upward to engage the lower ends of support members 102, which are then raised with the platform to open door 100.

It should be understood that the platform transport apparatus of the present invention may be embodied in a variety of configurations so as to move platform 36 vertically, horizontally, or in other directions. Moreover, the apparatus may be configured for suspension from a ceiling or wall so as to lower, rather than raise, the television or other object to a visible position. In this case, base 28 and transport mechanism 42 will be mounted at the top of housing 22, with door 30 at the lower end of housing 22. The housing will preferably be configured to be suspended from a ceiling or attic structure in a building, such that the television is below the plane of the ceiling in a position for viewing, but above the plane of the ceiling in the concealed position.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A load-distributing lifting apparatus comprising:
 a housing having a base and sidewalls;
 a platform disposed in the housing and movable in a first direction generally parallel to the sidewalls;
 a capstan rotatably mounted to the base;
 an endless cable movably coupled to the housing and wound about the capstan to move therewith, the endless cable having a first segment mounted to the platform at a first point, a second segment mounted to the platform at a second point, a third segment mounted to the platform at a third point and a fourth segment mounted to the platform at a fourth point, the first, second, third and fourth segments being parallel to the first direction and movable in the same direction simultaneously; and
 means for rotating the capstan to move the platform.

2. The apparatus of claim 1 wherein the capstan is a dual concentric capstan.

3. The apparatus of claim 1 further comprising a plurality of pulleys mounted on the sides of the housing for guiding the endless cable, the plurality of pulleys comprising a first pair of pulleys on a first side of the housing guiding the first segment, a second pair of pulleys on the first side of the housing guiding the second segment, a third pair of pulleys on a second side of the housing guiding the third segment and a fourth pair of pulleys on the second side of the housing guiding the fourth segment.

4. The apparatus of claim 1 further comprising means for applying tension to the cable to increase friction between the cable and the capstan.

5. The apparatus of claim 1 wherein the first direction is generally vertical.

6. The apparatus of claim 1 wherein the housing defines an enclosure having an open side.

7. The apparatus of claim 6 further comprising a door on the open side openable in response to moving the platform.

8. The apparatus of claim 7 wherein a pair of doors are hingedly mounted to the housing, the apparatus further comprising a pair of connecting rods each having a first end coupled to the platform and a second end coupled to one of the doors.

9. The apparatus of claim 8 wherein the first ends of the connecting rods are connected to a sliding member slidably coupled to the housing, the sliding member being engaged by the platform to move therewith within a range of movement, said range of movement being less than the 10. The apparatus of claim 7 wherein the door is fixed relative to the platform generally parallel thereto, the door being mounted to support members extending from the platform.

11. The apparatus of claim 1 wherein the means for rotating the capstan comprises an electric motor.

12. The apparatus of claim 1 wherein the housing comprises a cabinet for concealing a television.

13. The apparatus of claim 1 wherein the housing is mounted in a building structure between floors thereof, the platform comprising a dumbwaiter.

14. Apparatus for concealing a television comprising:
 a housing having a horizontal base and vertical sides defining an enclosure with an open end;
 a platform disposed in the housing having a horizontal support surface for supporting a television, the platform movable in a generally vertical direction;
 a dual concentric capstan rotatably mounted to the base;
 an endless cable movably coupled to the housing and wound about the capstan to move therewith, the endless cable having a first segment attached to the platform at a first point, a second segment attached to the platform at a second point, a third segment attached to the platform at a third point and a fourth segment attached to the platform at a fourth point, the first, second, third and fourth segments being vertical and movable in the same direction simultaneously; and means for rotating the capstan to move the platform.

15. The apparatus of claim 14 further comprising a door for covering the open end, the door openable in response to movement of the platform toward the open end.

16. The apparatus of claim 14 further comprising means for applying tension to the cable to increase friction between the cable and the capstan.

17. The apparatus of claim 14 wherein the base is at a top end of the housing, the housing being configured for suspension from a raised structure so that the television may be lowered into a position for viewing below a lower end of the housing.

* * * * *